(12) United States Patent
Rosenthal et al.

(10) Patent No.: US 11,571,101 B2
(45) Date of Patent: Feb. 7, 2023

(54) BLOWERVAC SAFETY GRILL

(71) Applicant: BLACK + DECKER INC., New Britain, CT (US)

(72) Inventors: Matthew Rosenthal, Baltimore, MD (US); John Palermo, Baltimore, MD (US); Justin Cooper, Shrewsbury, PA (US); Joseph Beyer, Elkridge, MD (US)

(73) Assignee: Black & Decker, Inc., New Britain, CT (US)

( * ) Notice: Subject to any disclaimer, the term of this patent is extended or adjusted under 35 U.S.C. 154(b) by 1070 days.

(21) Appl. No.: 16/124,339

(22) Filed: Sep. 7, 2018

(65) Prior Publication Data

US 2020/0077857 A1    Mar. 12, 2020

(51) Int. Cl.
*A47L 9/28* (2006.01)
*A47L 9/10* (2006.01)
*A47L 5/14* (2006.01)

(52) U.S. Cl.
CPC .............. *A47L 9/2889* (2013.01); *A47L 5/14* (2013.01); *A47L 9/10* (2013.01)

(58) Field of Classification Search
CPC ............. A47L 9/2889; A47L 9/10; A47L 5/14
USPC ........................................................... 15/344
See application file for complete search history.

(56) References Cited

U.S. PATENT DOCUMENTS

| | | | |
|---|---|---|---|
| 4,694,528 A * | 9/1987 | Comer ................... | A01G 20/47 15/330 |
| 4,870,714 A | 10/1989 | Miner | |
| 5,535,479 A | 7/1996 | Pink et al. | |
| 5,560,078 A | 10/1996 | Toensing et al. | |
| 5,586,359 A * | 12/1996 | Iida ........................... | A47L 5/14 15/330 |
| 5,689,852 A * | 11/1997 | Svoboda ................... | A47L 9/02 15/405 |
| 6,003,199 A | 12/1999 | Shaffer | |
| 6,059,541 A * | 5/2000 | Beckey ...................... | A47L 5/14 417/295 |
| 6,442,790 B1 | 9/2002 | Svoboda et al. | |
| 7,685,673 B2 | 3/2010 | Kremsler et al. | |
| 7,735,188 B2 | 6/2010 | Shaffer | |
| 2003/0066159 A1 | 4/2003 | Sanders et al. | |

(Continued)

FOREIGN PATENT DOCUMENTS

EP       0723759 B1    7/2002
EP       2628382 B1    12/2015

OTHER PUBLICATIONS

Extended European Search Report, dated Jan. 22, 2020.

*Primary Examiner* — Joseph J Hail
*Assistant Examiner* — J Stephen Taylor
(74) *Attorney, Agent, or Firm* — John Yun (57) ABSTRACT

The present invention is directed to a blowervac device having a grill that requires to distinct steps in securing the grill over a fan to activate a safety switch allowing power to the motor. The grill has an outer ring and a rotatable inner cover. The first step is simply to secure the grill over the fan. The second step requires the cover to be rotated, which activates an actuator for the safety switch, allowing power to be delivered to the motor and operation of the device. This two-step process reduces the likelihood if inadvertent operation of the device and reduces the chances of injury.

12 Claims, 15 Drawing Sheets

(56) References Cited

U.S. PATENT DOCUMENTS

2010/0086412 A1    4/2010  Egawa
2013/0212830 A1*  8/2013  Stones .................... A47L 5/225
                                                15/330

* cited by examiner

BLOWERVAC SAFETY GRILL

FIELD OF THE INVENTION

This application is directed to a locking mechanism for a grill for a blower-vacuum type outdoor device to prevent inadvertent exposure of the fan assembly.

BACKGROUND OF THE INVENTION

Combination blower-vacuum devices, commonly referred to as blowervacs are well known in the art. These devices have a blow mode where air is blown out of an outlet tube to blow leaves, grass clippings and other yard debris to clear patios, sidewalks and other areas. The devices also have a vacuum mode where they suck in leaves and other yard debris through a vacuum tube for disposal into a collection bag.

When in the blow mode, a grill typically covers the air intake and blocks access to the fan. The grill allows the passage of air, but prevents the user's hand from accidently contacting the fan. When converting from the blow mode to the vacuum mode, the grill is typically removed and a vacuum tube is placed over the fan assembly and a collection bag is attached in place of the outlet tube. Therefore, in either the blow mode or vacuum mode, the fan is covered by the grill or the vacuum tube, respectively, and it would be advantageous to ensure that the grill or vacuum tube remain locked in place.

BRIEF SUMMARY OF THE INVENTION

Therefore, the present invention is directed to a blowervac device having a housing with a volute that encloses a fan. A motor is operatively connected to the fan, so that in a blow mode air is drawn through an air inlet into the volute and blown out through an outlet tube. A grill covers the air inlet and is movable between an open and closed position, so that only when the grill is in the closed and locked position, can the motor be actuated. This guards against exposing the fan while it is spinning.

The blowervac can be converted to operate in a vacuum mode, where the device sucks in leaves or other yard debris into a collection bag. The conversion requires the grill to be removed and a vacuum tube placed over the air inlet. Similar to the blow mode, the motor can only be actuated when the vacuum tube is placed over the inlet and locked into position.

The blowervac has a safety switch that only allows the motor to be actuated when the safety switch is engaged. In both the blow and vacuum modes, the safety switch is engaged only when the grill or vacuum tube is closed and rotated into its locked position.

In an embodiment of the invention, the grill includes an outer ring with an inner cover that is rotatable within the outer ring. When the grill is initially closed over the air inlet, the cover is in a first position that covers the air inlet, but does not engage the safety switch. Only when the cover is rotated into a second locked position, does it engage the safety switch and allow the motor to be actuated. This two-step process, e.g. the first step of closing the grill and the second step of rotating the cover, decreases the likelihood of inadvertent exposure of the fan.

In another aspect of the invention, the volute has a skirt with an L-shaped slot and the cover has a pin that corresponds with the slot. Upon closing the grill over the volute, the pin enters the slot and then the cover can be rotated into the locked position. The slot provides a secure arrangement for rotation of the cover.

In another aspect of the invention, the cover has a boss that slides into and out of engagement with a safety switch actuator. When the grill is closed over the volute, the boss does not engage the actuator. Only when the cover is rotated does the boss engage the actuator and activate the safety switch.

BRIEF DESCRIPTION OF THE INVENTION

Further features and advantages of the present invention will be better understood by reference to the following description, which is given by way of example and in association with the accompanying drawings, in which.

DETAILED DESCRIPTION OF THE INVENTION

Figure 1:
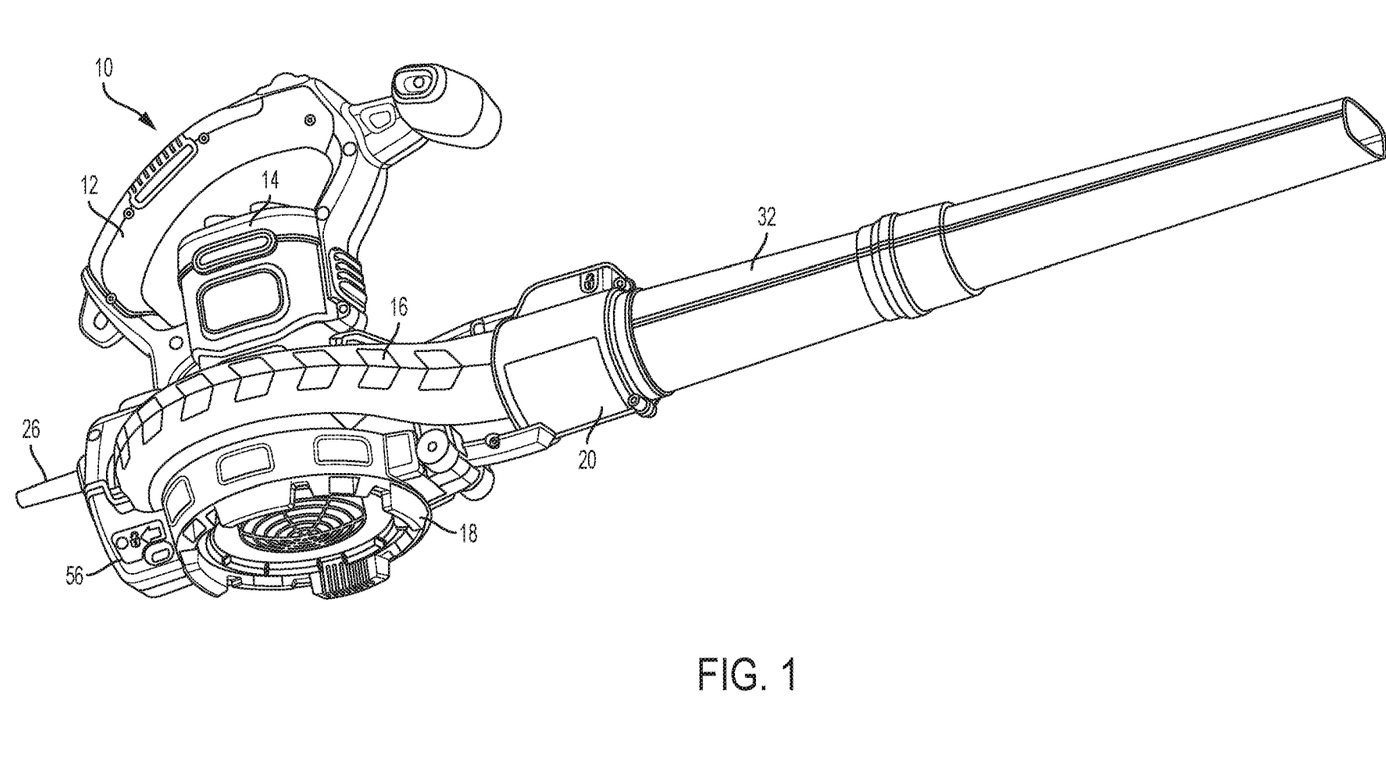
FIG. 1 is a perspective view of a blowervac in a blow mode.
Figure 2:
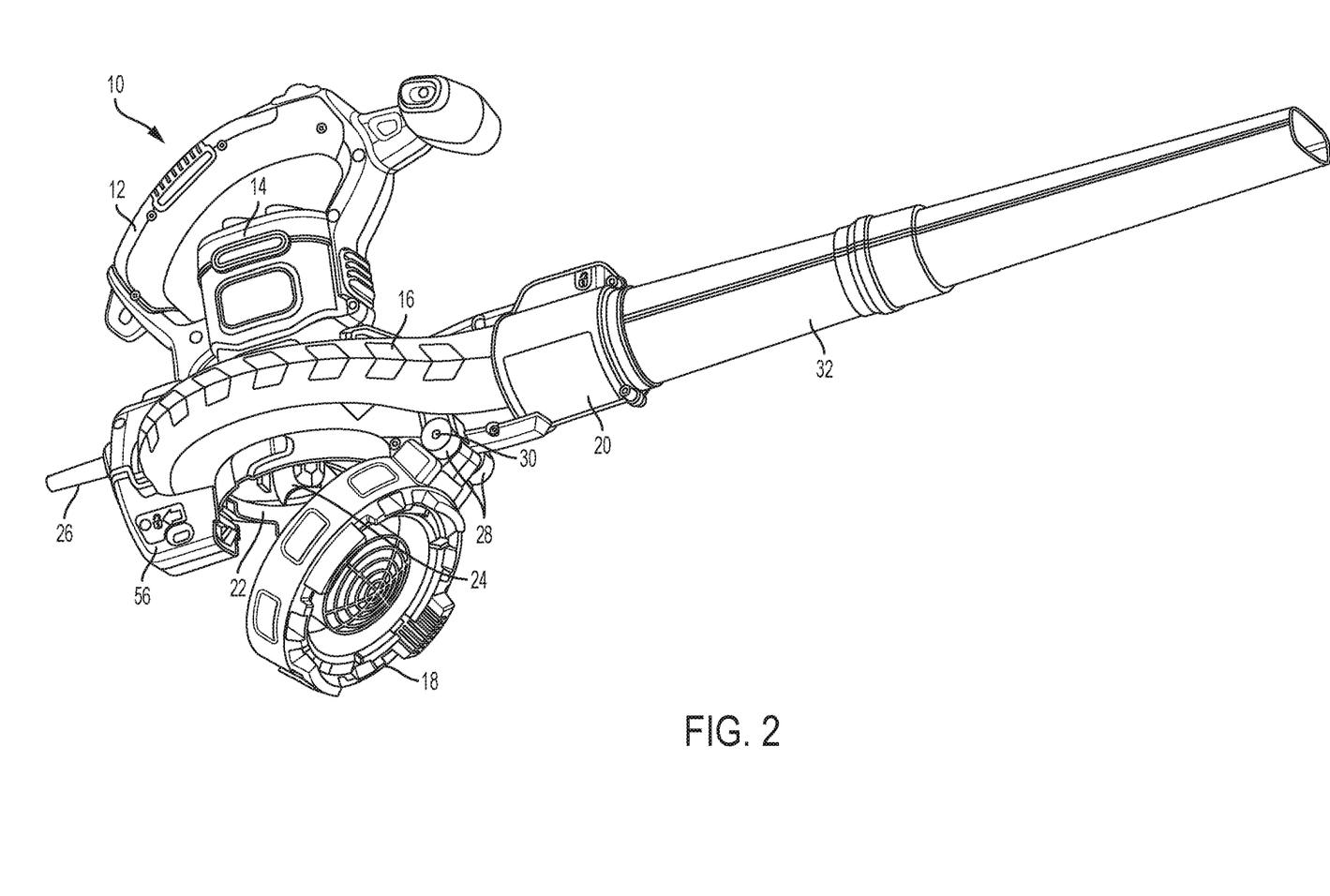
FIG. 2 is a view of FIG. 1 with the grill in an open position.

FIGS. 1 and 2 show a blowervac device of the present invention having a main housing 10, which includes a handle 12, a motor housing portion 14 and a foot portion 56. A volute 16 is secured to a lower portion of the housing 10 and encloses a fan 24 (shown in FIG. 2). A grill 18 is secured over a volute opening 22 to cover the fan 24, with FIG. 1 showing the grill 18 in a closed position and FIG. 2 showing the grill 18 in an open position. The grill 18 is pivotally secured to the volute by two ears 28 via a boss or pin 30. The pin can be a separate piece or can be integrally formed on either the grill or volute with corresponding recesses in the other piece.

At the rear of the housing 10 is an electrical cord 26 that provides power to a motor for rotating the fan 24. Alternatively, the motor can be powered by a removable rechargeable battery for increased portability.

Figure 3:
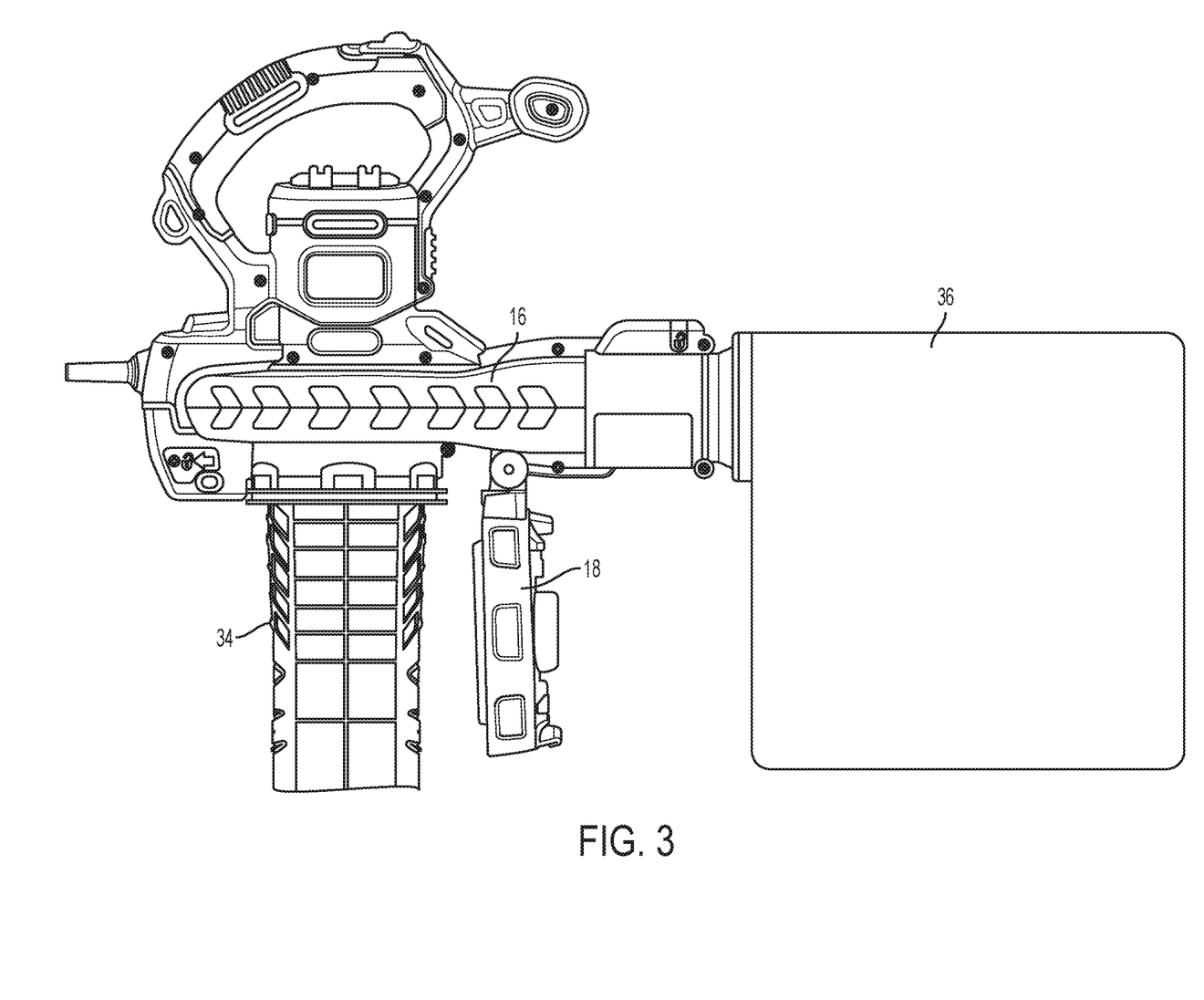
FIG. 3 is a view of a blowervac in a vacuum mode.

FIG. 1 shows the blowervac operating in a blow mode with an air outlet tube 32 removably connected to a free end 20 of the volute 16. In operation, air is drawn into the volute 16 through the grill 18 by the fan 24, and is blown out through the outlet tube 32. When operating in a vacuum mode, as shown in FIG. 3, the grill 18 is rotated away from volute opening 22 and a vacuum tube 34 is attached. The outlet tube 32 is replaced with a collection bag 36 so that any leaves, yard waste or other debris vacuumed up is blown into the collection bag 36.

Figure 4:
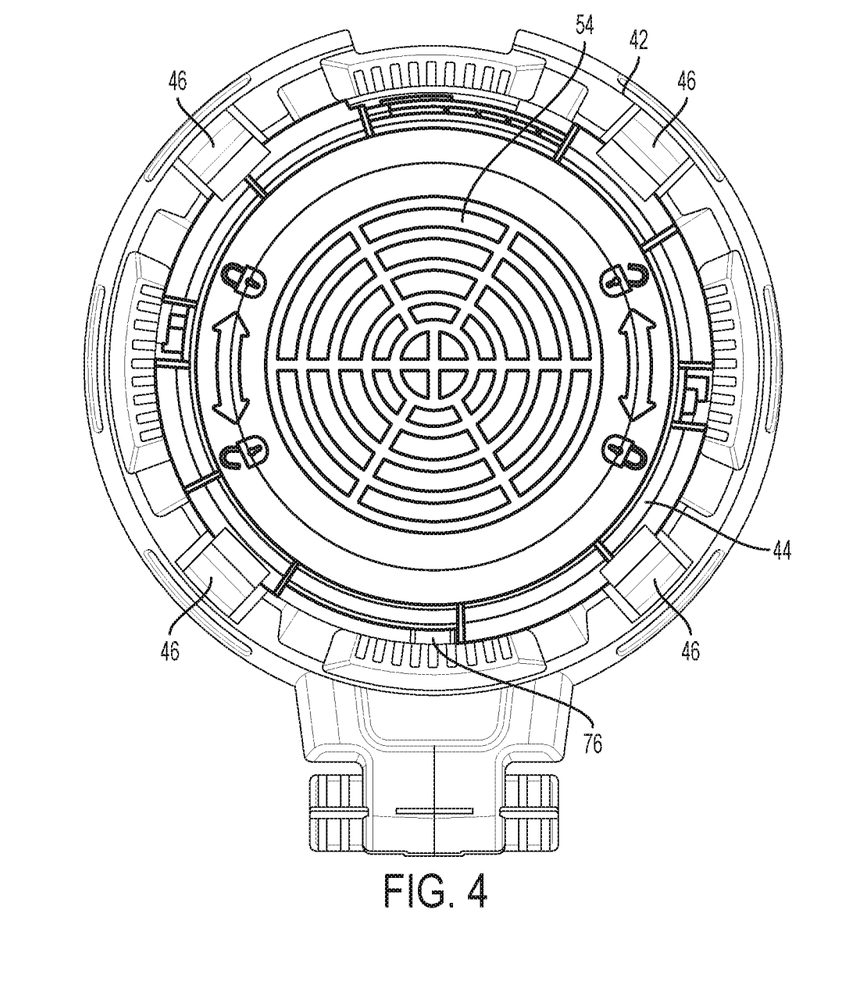
FIG. 4 is a bottom view of the grill.

FIG. 4 shows a bottom view of the grill 18, which includes an outer support ring 42 and an inner cover 44 that is rotatable within the ring 42. The inner cover 44 is shown with a thicker line weight to help distinguish it from the outer ring. The cover 44 includes concentric air vents 54 to allow airflow to pass through.

Figure 5:
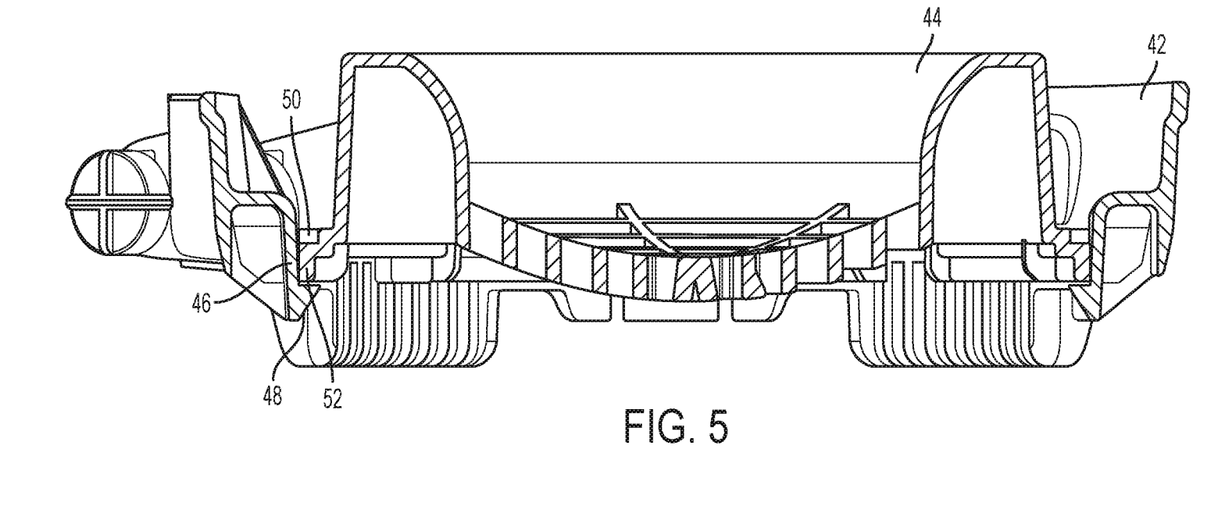
FIG. 5 is a sectional view of the grill

The outer ring 42 includes four arms 46 around its circumference that secure the cover 44 in place. FIG. 5 is a sectional view showing one of the arms 46. The arm 46 is a flexible member that includes an angled cam surface 48. The cover 44 is secured to the ring 42 by pushing the cover 44 up from the bottom against the cam surface 48, which biases the arms 46 outwardly. As a tongue 52 passes the cam surface 48, it becomes secured in a groove in the ring 42 between the arm 46 and a rib 50, securing the cover 44 within the ring 42.

As shown in FIG. 2, the grill 18 is pivotably secured to the volute 16 at the ears 28, and pivots into and out of engagement with a foot portion 56 of the housing 10. Now referring to FIGS. 6 and 7, the foot portion 56 encloses a movable latch 38 that extends out of the foot portion 56 via a spring 57. An end 39 of the latch 38 is angled so that as the grill 18 is closed, a protrusion 45 on the cover 44 slides past the latch 38 and secures the latch between the protrusion 45 and a lip 40 on the cover. To unlock the grill 18, the latch 38 is pulled inwardly into the foot portion 56, allowing it to be pivoted away from the volute.

Figure 6:
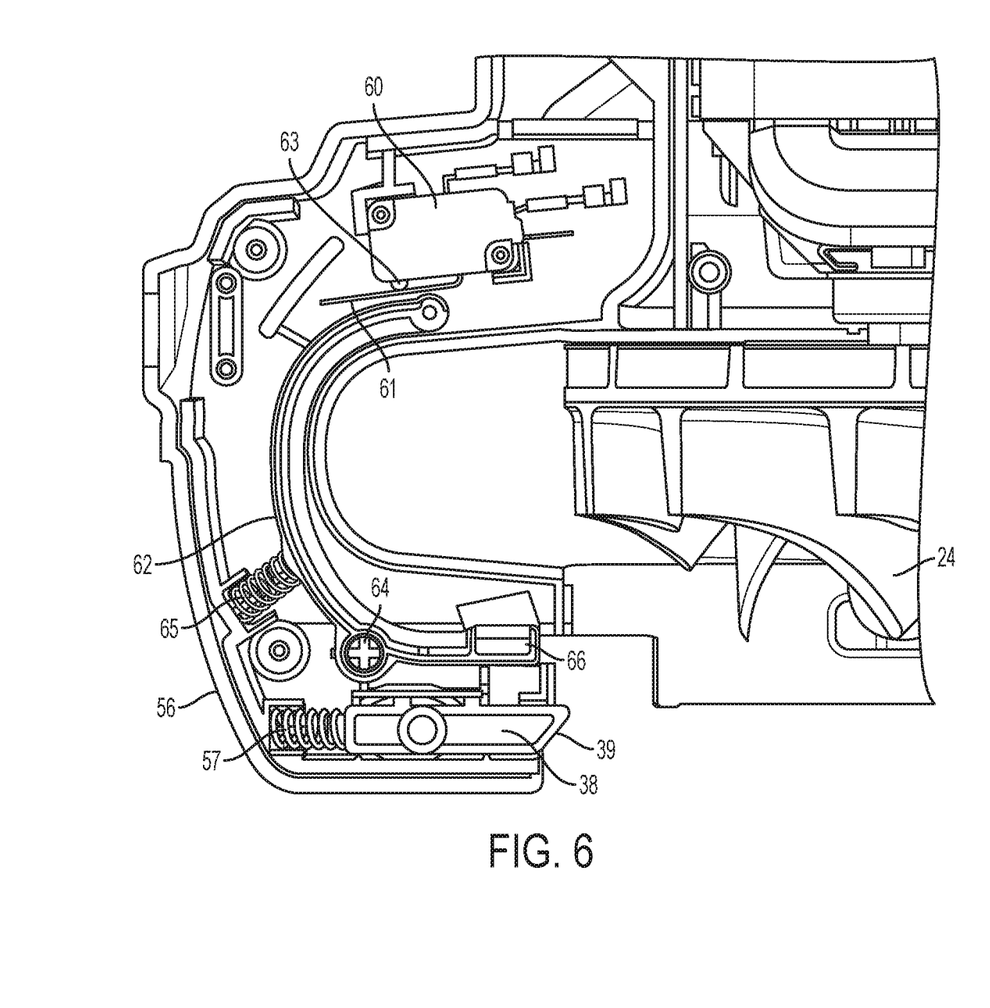
FIG. 6 is sectional view of a foot portion of the housing.
Figure 7:
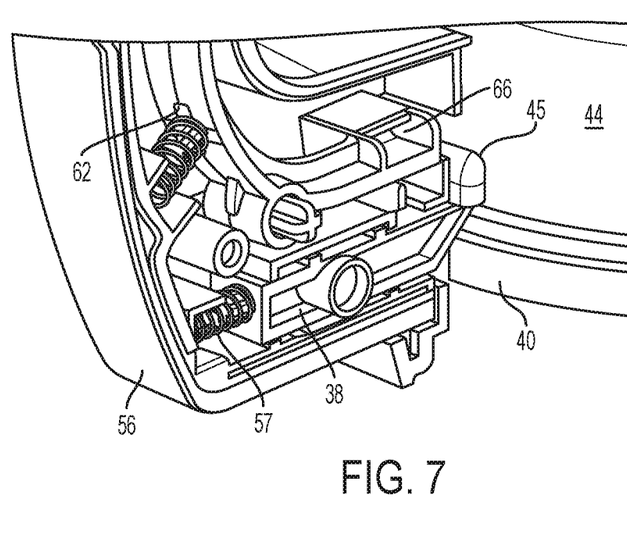
FIG. 7 is view of actuator in the "off" position.

Now referring to FIGS. 6 and 8, the operation of a safety switch 60 will be described. The safety switch 60 must be actuated before power can be delivered to the motor. The safety switch 60 is located in the main housing and is selectively engageable with a generally C-shaped actuator 62 that rotates about a pivot point 64. The switch 60 includes a lever 61 that contacts a button 63 for turning the switch 60 "on" and "off". A spring 65 urges the actuator 62 into the default "off" position shown in FIG. 6.

Figure 8:
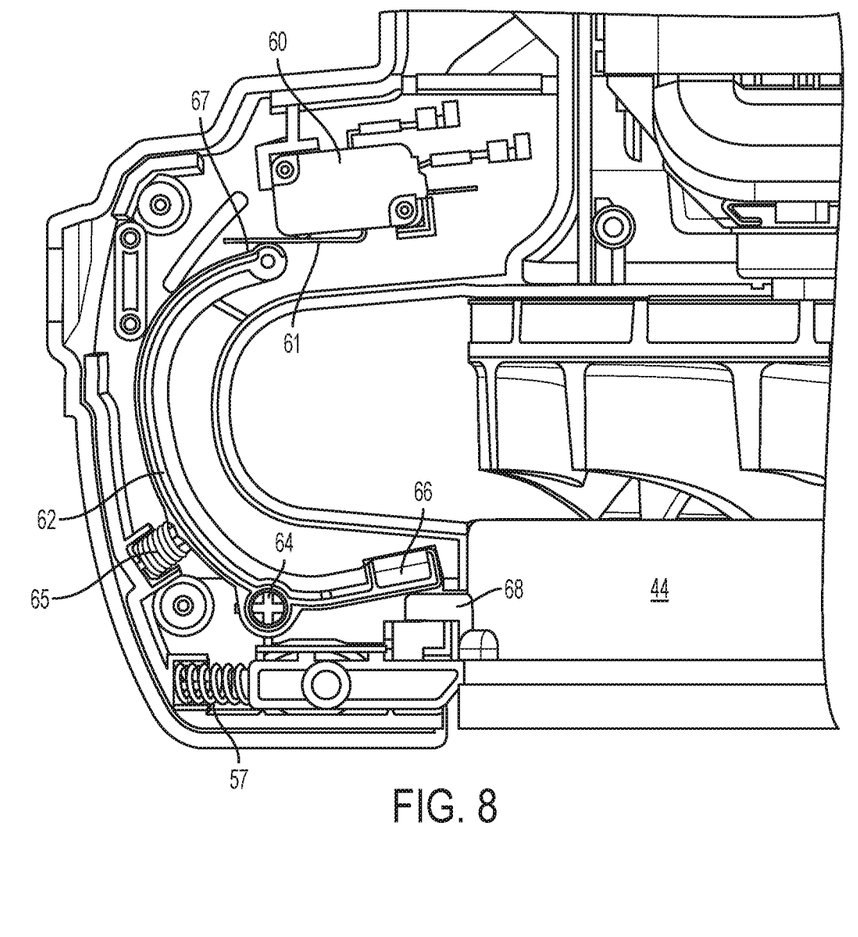
FIG. 8 is a view of the actuator in an "on" position.
Figure 9:
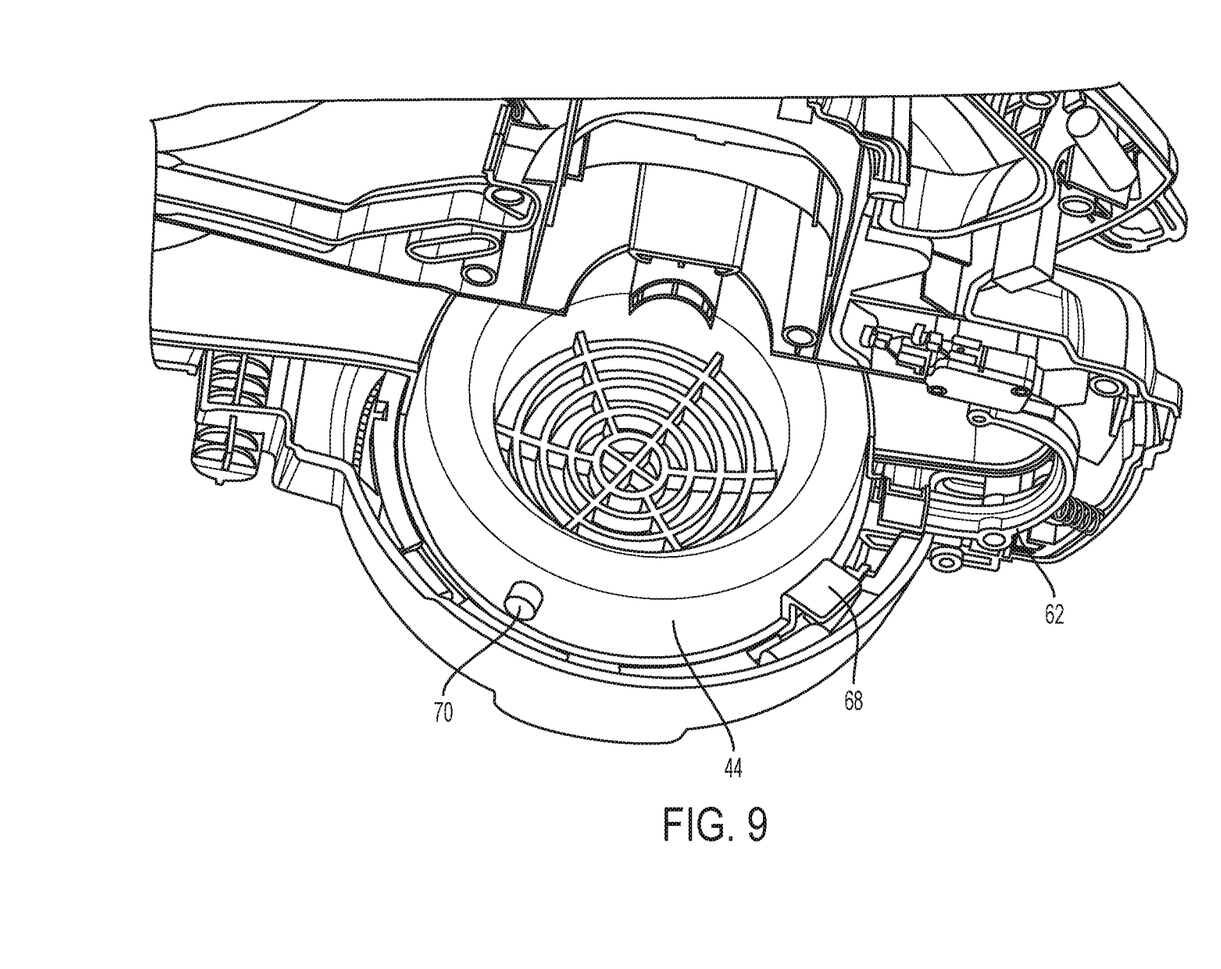
FIG. 9 is a view of the cover in an "off" position.

Now referring to FIG. 8, to activate the switch 60 a boss member 68 on the cover 44 rotates into engagement with a free end 66 of the actuator 62. The actuator 62 pivots about its pivot point 64 against the bias of the spring 65 and the other free end 67 presses the lever 61 against the button 63 to turn "on" the safety switch 60. When the safety switch is in the "on" position, the motor of the blowervac can be actuated. FIG. 9 shows another view of the boss 68 prior to engagement with the actuator 62.

Figure 10:
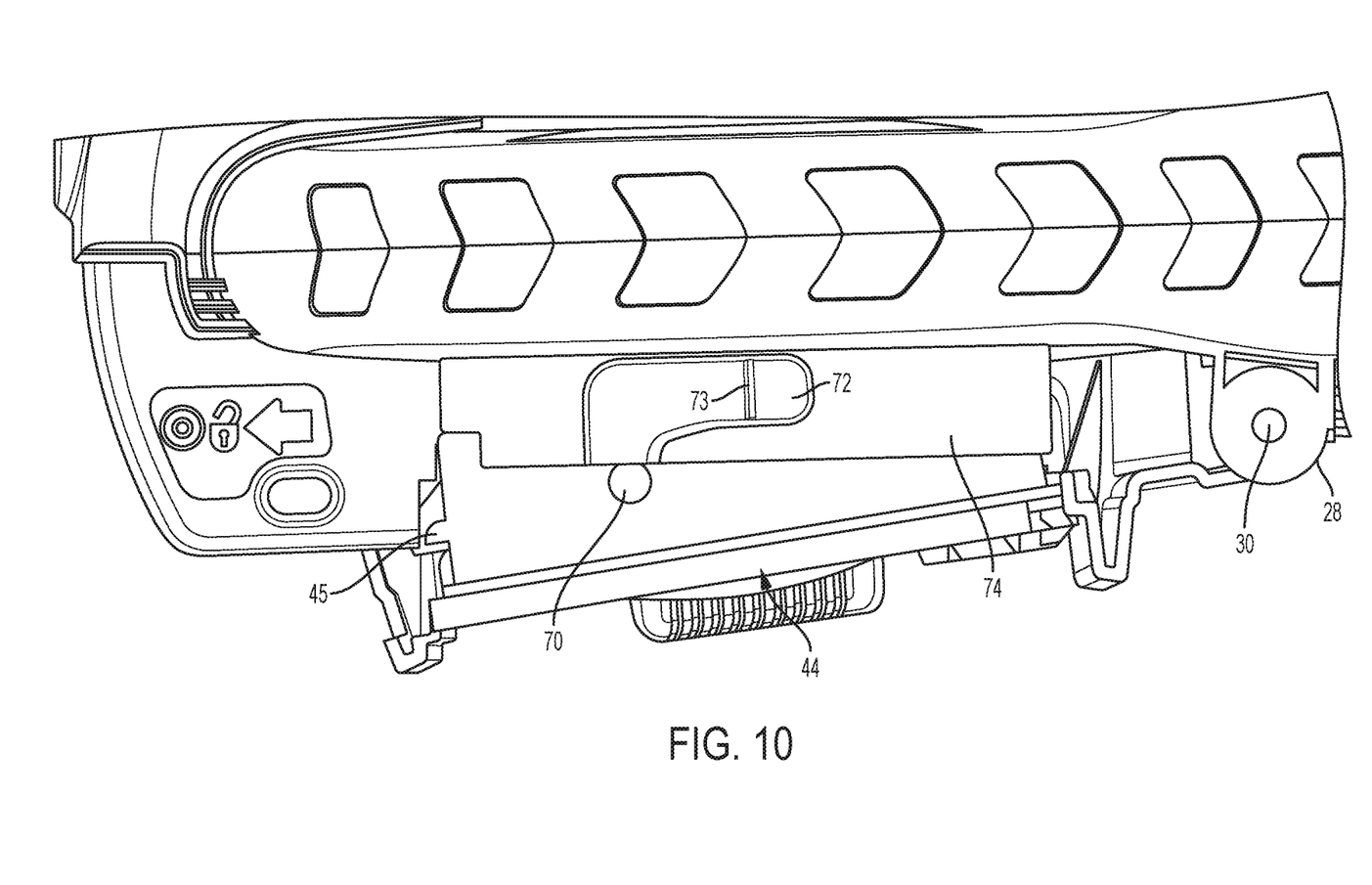
FIGS. 10-12 is a side view of the grill and volute.
Figure 11:
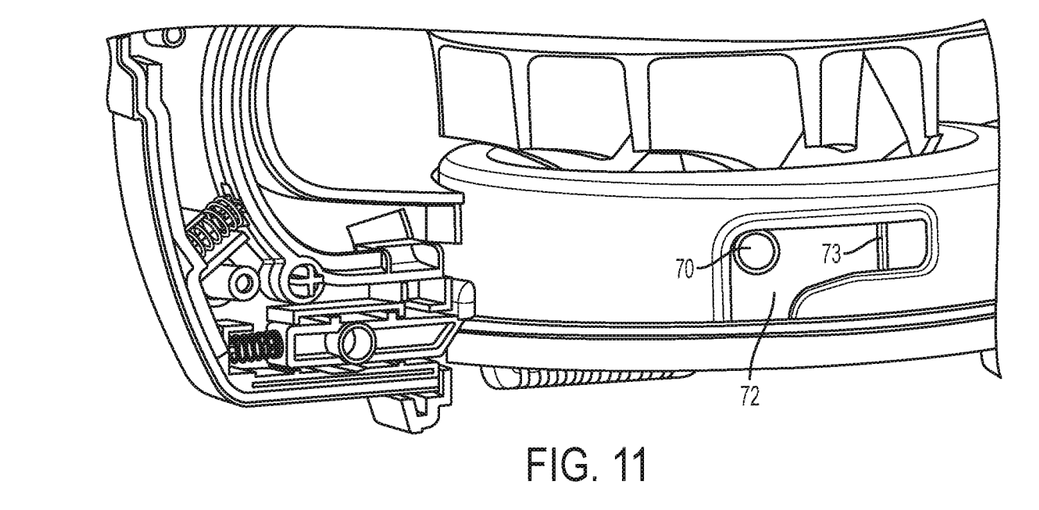

FIG. 9 further shows the cover 44 having a pin 70 that helps to secure the grill 18 to the volute 16. There are two pins 70 on opposite sides of the cover, but only one is shown. Referring to FIG. 10, when the grill 18 is closed, the pin 70 enters an L-shaped slot 72 in a skirt portion 74 of the volute 16. FIG. 11 shows the pin 70 upon initial entrance into the slot 72, after which the cover 44 is rotated relative to the support ring 42, and the pin 70 slides to the end of the slot 72 and is secured the volute 16. The slot 72 includes a small bump 73 that the pin 70 rides over and helps to keep in the pin 70 in place. In addition to securing the grill 18 to the volute 16, the turning of the cover 44 also rotates the boss 68 into engagement with the actuator 62 to activate the switch 60. Therefore, powering the motor and actuating the tool requires the user to take two distinct steps. First the user must close the grill 18 over the volute 16, and then the user must rotate the cover 44 to actuate the switch 60. This two-step process reduces the likelihood of accidental actuation of the tool and reduces the chances of injury to the user.

Figure 12:
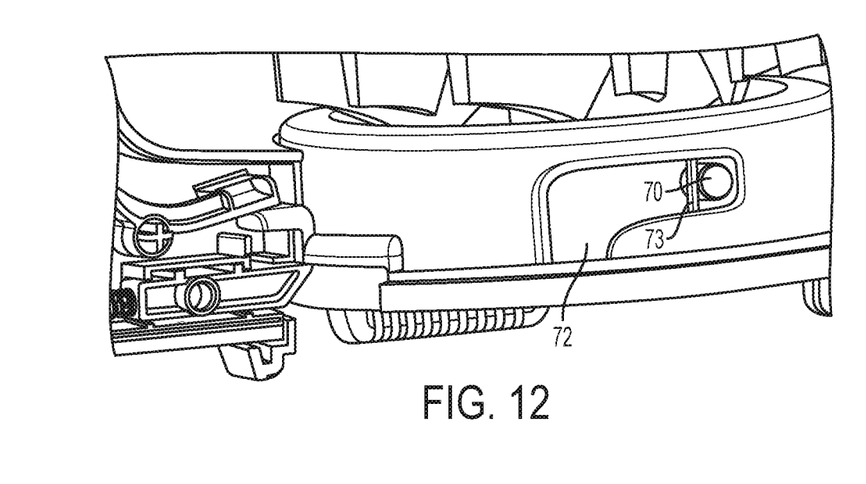
Figure 13:
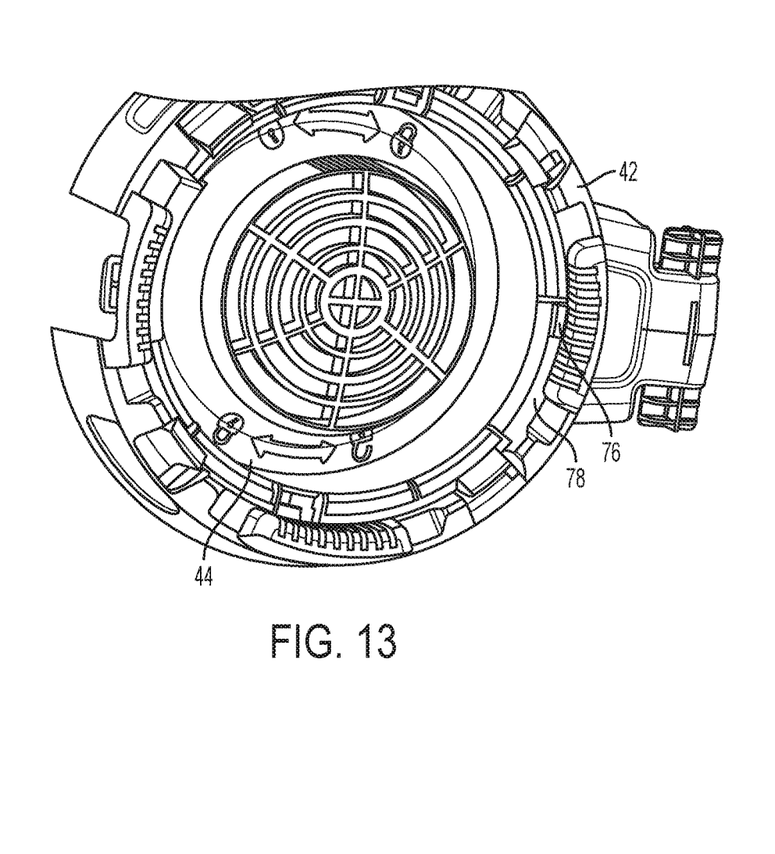
FIGS. 13 and 14 are bottom views of the grill with the cover in "off" and "on" position, respectively.
Figure 14:
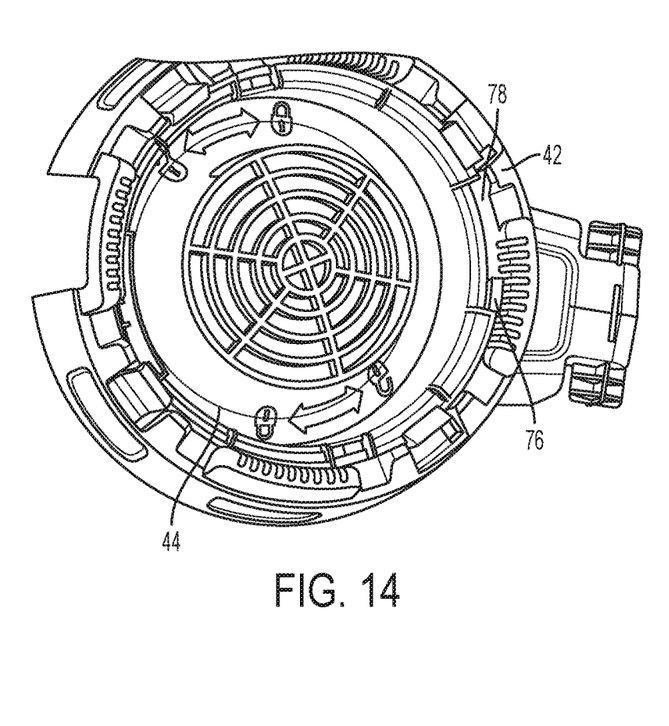

FIGS. 13 and 14 show a further aspect of the invention. The outer ring 42 includes a rib 76 that confines the rotational extent of the cover 44 (the rib can also be seen in FIG. 4). The cover 44 has a cut-out 78 within which the rib 76 resides, and in this way, the cover 44 can only be rotated within the limited spaced defined by the cut-out 78. The distance between the ends of the cut-out 78 correspond to the length of the slot 72 so that the cover position shown in FIG. 14 corresponds with the pin 70 lining up with the opening in the slot 72 as shown in FIG. 10, and the cover position shown in FIG. 13 corresponds with the locked pin position shown in FIG. 12. The rib 76 and cut-out 78 prevent over-rotation of the cover 44 and reduces the likelihood of damage to the tool. Furthermore, this assists in locating the pin 70 in its proper position to help close and open the grill.

Figure 15:
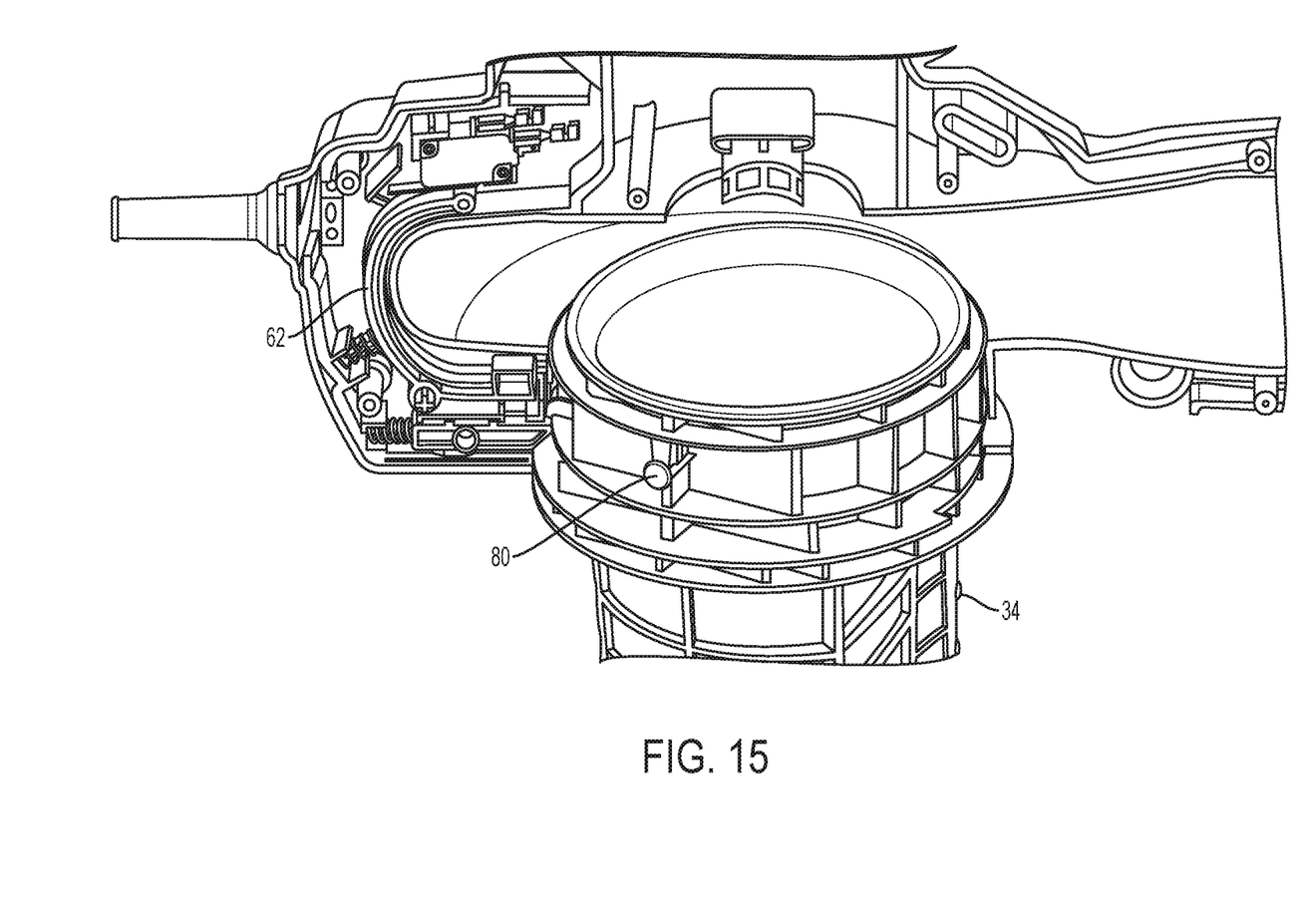
FIG. 15 shows a vacuum tube attached to the blowervac in an "off" position.
Figure 15A:
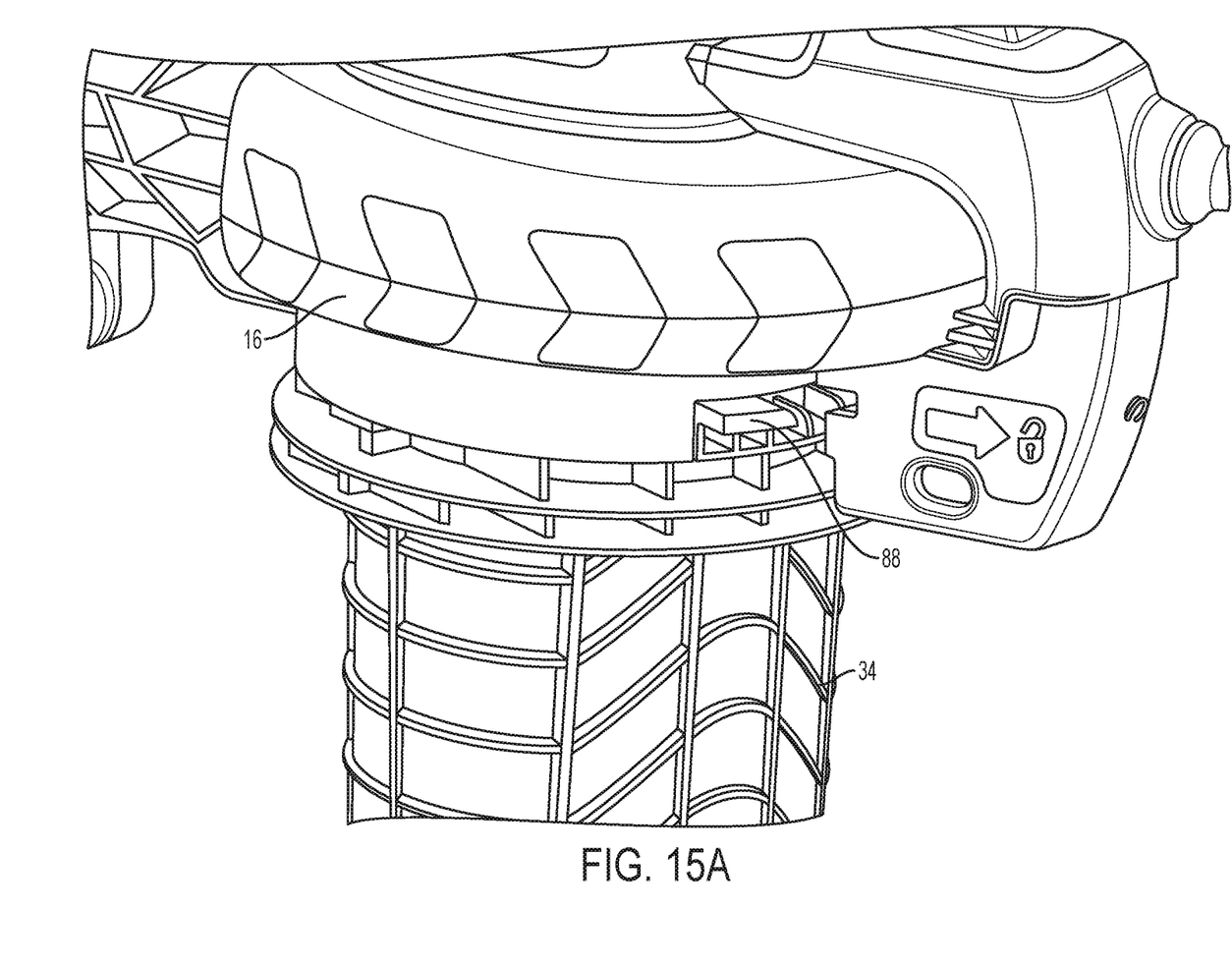
FIG. 15A shows a rear perspective view of FIG. 15.
Figure 16:
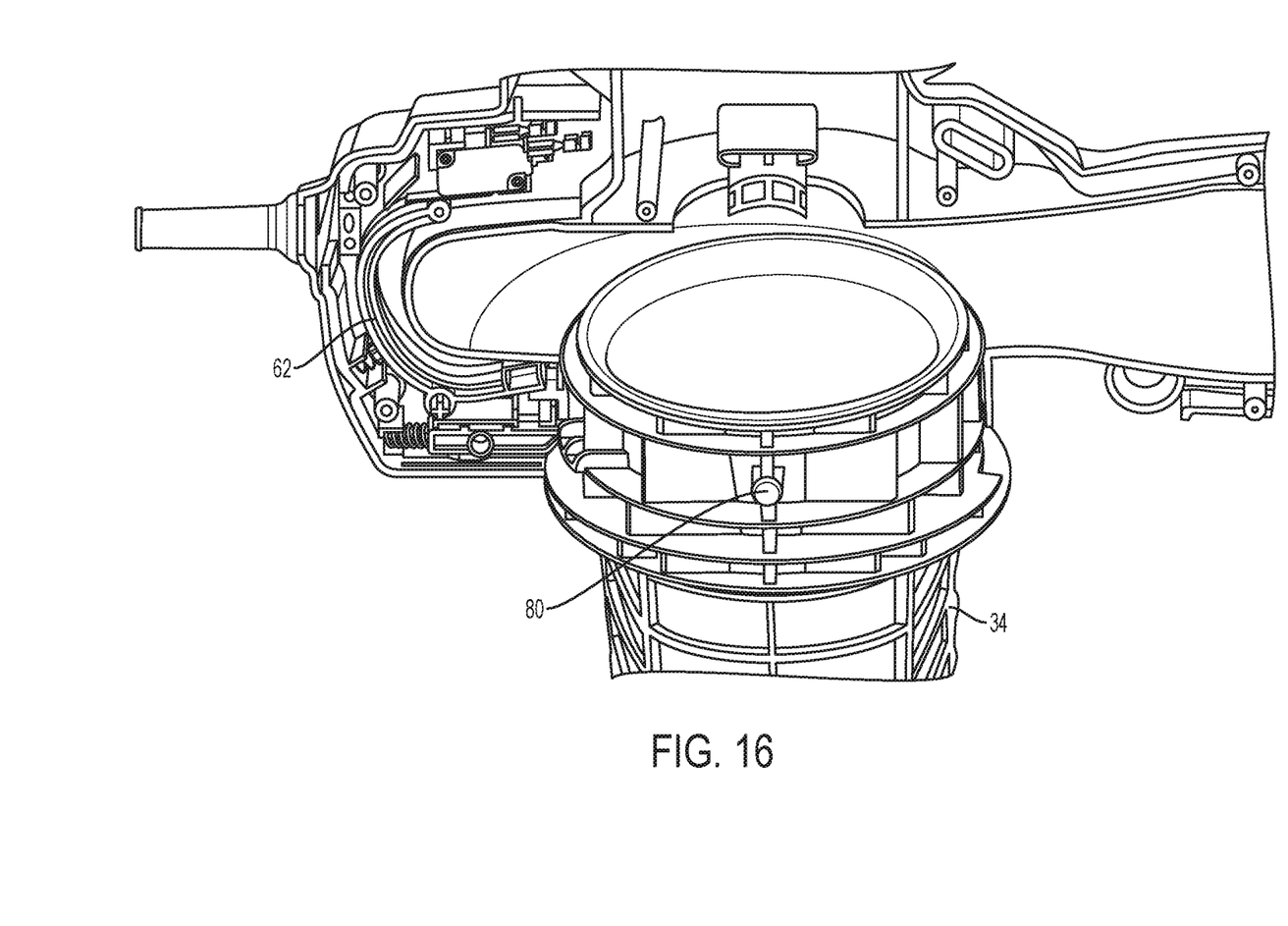
FIG. 16 shows the vacuum tube attached to the blowervac in an "on" position.

Now referring back to FIG. 3, when the device is used in the vacuum mode, the grill 18 is pivoted open to expose the fan 24. The vacuum tube 34 is attached to the volute 16 and rotated with respect to the volute in the same way that the cover 44 is attached and rotated to actuate the safety switch 60. Referring to FIGS. 15-16, the vacuum tube includes a pin 80 (similar to the pin 70 on the cover 44) that is secured within the slot 72 of the volute 16. The vacuum tube also includes a boss 88 (similar to boss 68 on the cover 44) that engages with the free end 66 of the actuator 62. FIGS. 15 and 15A show the vacuum tube 34 in an "off" position so that the boss 88 is not engaged with the actuator 62. FIG. 16 shows the vacuum tube rotated relative to FIG. 15 so that the boss engages the actuator 62. In this way, the vacuum mode, like the blow mode, requires two steps to engage the safety switch 60.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A blowervac device, comprising:
    a housing having a motor;
    a fan driven by the motor;
    a volute connected to the housing and enclosing the fan, the volute having an air inlet and an air outlet;
    a grill connected to the volute adjacent the air inlet and capable of rotating to cover the air inlet in a blow mode, the grill having an outer ring and a cover rotatable within the ring; and
    a safety switch being activated by the rotation of the cover, the safety switch preventing actuation of the motor when in the non-actuated position.

2. The blowervac device according to claim 1, wherein the volute has a skirt with a slot therein, the cover having a pin that enters the slot when the grill is closed over the air inlet to the volute.

3. The blowervac device according to claim 2, wherein the slot is L-shaped.

4. The blowervac device according to claim 1, further including an actuator for the safety switch that detects the rotation of the cover.

5. The blowervac device according to claim 4, wherein the actuator pivots within the housing in response to the rotation of the cover.

6. The blowervac device according to claim 4, wherein the cover has a boss that in a first position does not engage the actuator, and in a second position engages the actuator, wherein the second position is rotationally different than the first position.

7. The blowervac device according to claim 1, including a vacuum mode where a vacuum tube is attached to the air inlet of the volute, the vacuum tube having a first rotational position where a boss of the vacuum tube does not actuate the safety switch and a second rotational position that actuates the safety switch.

8. An outdoor garden device, comprising:
- a housing having a motor;
- a fan driven by the motor;
- a volute connected to the housing and enclosing the fan, the volute having an air inlet and an air outlet;
- a grill connected to the volute adjacent the air inlet and capable of rotating to cover the air inlet to the volute, the grill having an outer ring and a cover rotatable within the ring; and
- a safety switch being activated by the rotation of the cover, the safety switch preventing actuation of the motor when in the non-actuated position.

9. The outdoor garden device of claim 8, further comprising an actuator for activating the safety switch, the actuator moving in response to a boss on the cover to activate the safety switch.

10. A method of turning on an outdoor garden device comprising the steps of:
- providing a housing having a motor, a fan driven by the motor, a volute connected to the housing and enclosing the fan, the volute having an air inlet and an air outlet;
- providing a grill connected to the volute adjacent the air inlet, the grill having an outer ring and a cover rotatable within the ring;
- rotating the grill to cover the air inlet; and
- rotating the cover relative to the ring, the cover activating a safety switch allowing for the actuation of the motor.

11. The method of turning on an outdoor garden device of claim 10, wherein the volute has a skirt with a slot therein, the cover having a pin that enters the slot when the grill is closed over the air inlet to the volute.

12. The method of turning on an outdoor garden device of claim 10, wherein the cover has a boss that in a first position does not engage the actuator, and in a second position engages the actuator, wherein the second position is rotationally different than the first position.

* * * * *